Richard E. Von Berg
Arthur A. Pfeifer
INVENTORS

BY Huebner & Worrel
ATTORNEYS.

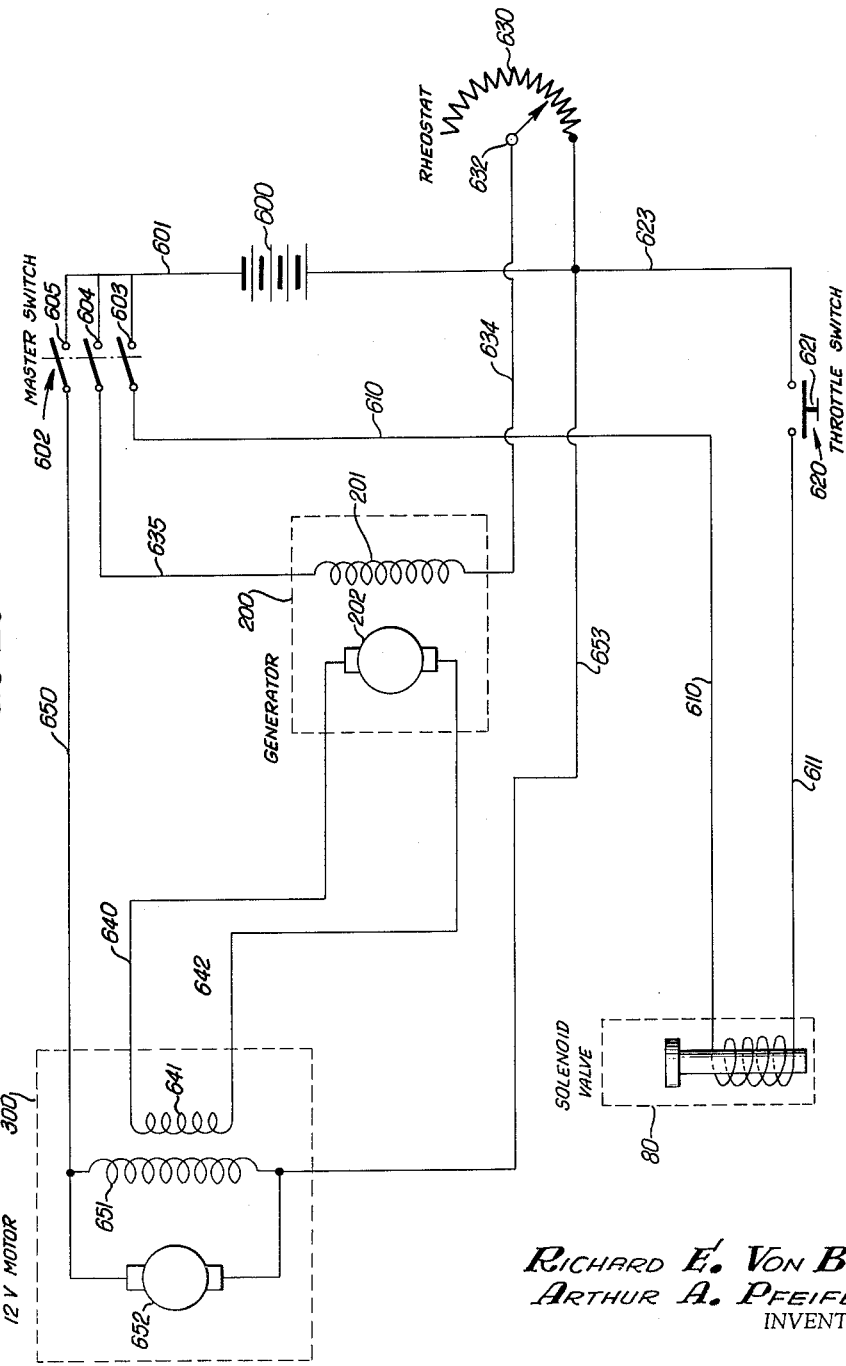

United States Patent Office 3,053,990
Patented Sept. 11, 1962

3,053,990
ELECTRO-HYDRAULIC SPEED CONTROL DEVICE
Richard E. Von Berg, Anaheim, and Arthur A. Pfeifer, Whittier, Calif., assignors to Rheem Manufacturing Company, New York, N.Y., a corporation of California
Filed June 23, 1961, Ser. No. 128,287
23 Claims. (Cl. 290—40)

This invention relates to an electro-hydraulic device for rapid adjustable control of the speed of operation of an internal combustion engine. The device is adaptable for use on a stationary internal combustion engine, in which use the device is activated by a load change on the engine. However, its principal suggested use is as a speed control device for the internal combustion engine of an automotive vehicle, when it is desired to control engine speed relative to vehicular speed.

In modern automotive vehicles, capable of smooth operation at sustained high speeds, particularly on the open highway, it is often desirable to provide a control device for automatically limiting vehicular speed to any predetermined level. Many such devices have been offered, but all of them have functional limitations which are readily overcome by the device of the present invention.

To be completely acceptable, any such device should be capable of rapid, automatic adjustment to meet changing conditions so that, for example, if a vehicle equipped with such a device is travelling at a predetermined controlled speed and starts to climb a sharp upgrade, the speed control device will rapidly adjust to compensate for the added engine load, and will minimize vehicular speed slow-down, or if the vehicle under controlled speed starts on a sharp downgrade, the speed control device will rapidly adjust to compensate for the decreased engine load and will minimize vehicular speed increase.

Other available devices do not provide sufficiently rapid adjustment under such varying driving conditions, and often a wide variation from controlled speed results. The device of the present invention, however, is capable of rapid adjustment to such varying engine load conditions, and thus maintains predetermined vehicular speed with minimal variation.

Another desired feature of a satisfactory vehicular speed control device is the ability to quickly "override" the device and render it temporarily inoperative when, for instance, the automotive vehicle, travelling at controlled speed approaches a slower moving vehicle or other partial obstruction, and it is desired to pass the slower moving vehicle or obstruction at a rate of speed higher than the controlled speed. This is more readily accomplished with the device of the present invention.

Another desired feature of such a device is the ability to quickly "underride" the device temporarily when, for example, a sudden emergency arises and it is desired to decelerate rapidly. Again this is more readily accomplished with the device of the present invention.

Other speed control devices on the market (some of them operated by vacuum, manifold pressure, or elaborate electrical systems) are complicated; whereas, the device of the present invention is simple in design and construction, thus minimizing the possibility of breakdown and the requirement of frequent maintenance and repair. Furthermore, the device of the present invention does not require mechanical adjustment after original installation.

It is therefore an object of the invention to provide an adjustable control of the speed of operation of an internal combustion engine in which the device used is compact and may be readily installed on the engine.

It is another object of the invention to provide such a speed control device which, when mounted on an automotive vehicle, will rapidly adjust to changing road grade conditions.

It is still another object of the invention to provide such a device which may be quickly "overridden" or "underridden."

It is a further object of the invention to provide such a device which is simple in construction, and which may be inexpensively manufactured, installed and operated.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

FIGURE 2 is a wiring diagram showing the electrical system of the device of the present invention.

Figure 1:
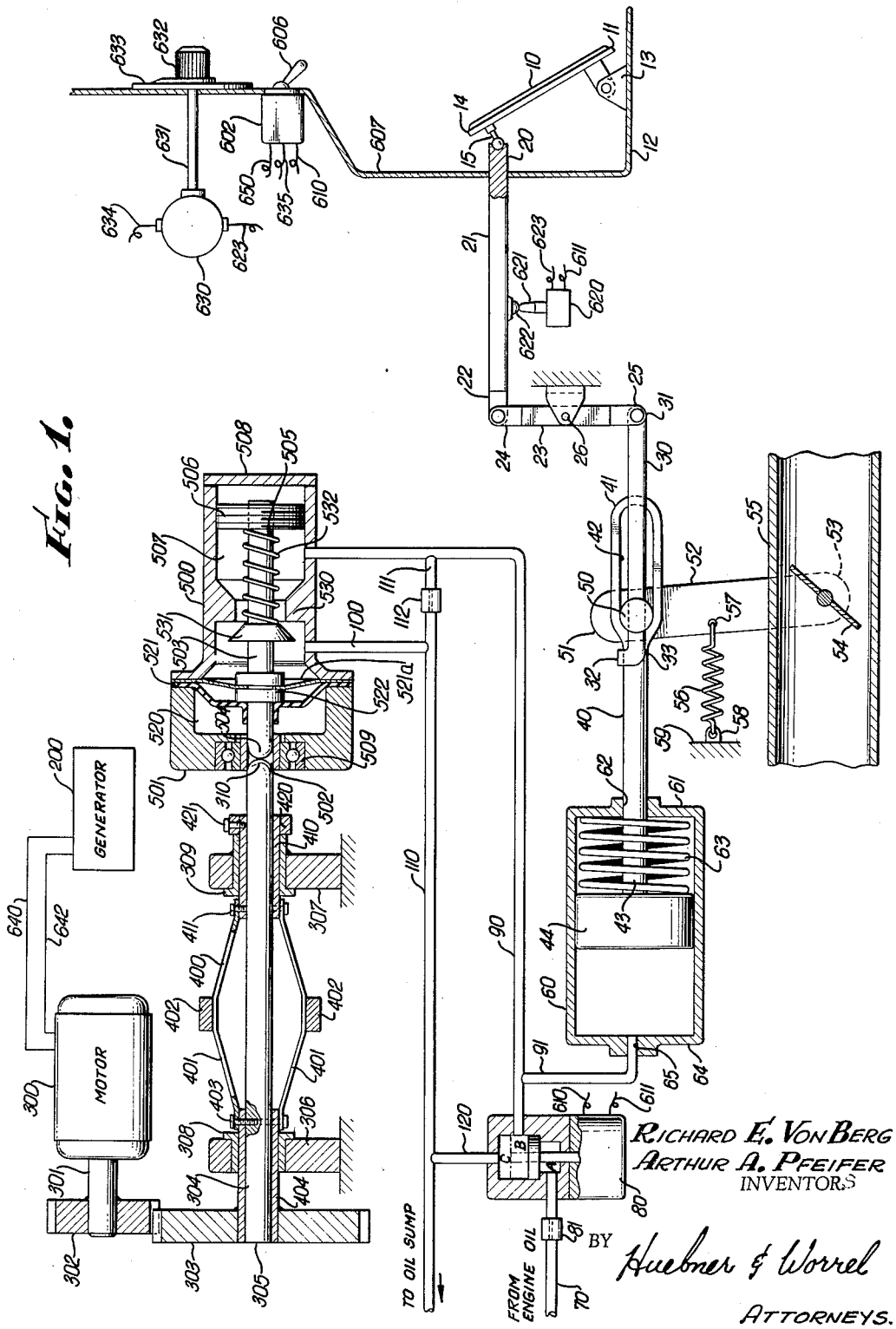
FIGURE 1 is a diagrammatic representation of the device of the present invention.

As shown in the drawings, a throttle accelerator pedal 10 is pivotally mounted adjacent one end 11 thereof to a suitable base, such as the floor board 12 of an automotive vehicle, by any suitable means, as by a hinge mounting 13. Adjacent the other end 14 of said pedal 10 is a pivotal mounting 15, such as the ball joint and lever mounting illustrated in FIGURE 1 of the drawings.

Operatively connected to said mounting 15 at one end 20 is a rod 21. Pivotally connected at or adjacent to the other end 22 of rod 21 is a rocker arm 23, rocker arm 23 being connected to rod 21 at or adjacent to one end 24 of said rocker arm 23. Rocker arm 23 has another end 25, and is pivotally connected intermediate its ends 24 and 25, as by pivotal connection 26, to a stationary object, such as the engine block (not shown).

A rod 30 is pivotally connected at or adjacent to its end 31 to end 25 of rocker arm 23. A flange or shutter 32 is formed at the other end 33 of rod 30.

A piston actuator rod 40 is disposed in extended parallel relationship with rod 30, and said actuator rod 40 has an end 41, adjacent to which is an elongate slotted opening 42. The other end 43 of said actuator rod 40 is connected to a piston 44.

Slidably disposed in said elongate slotted opening 42 is a shank 50, said shank 50 being mounted at one end thereof at or adjacent to end 51 of a lever arm 52. The other end 53 of said lever arm 52 is operatively connected to a fuel input means, such as a flow valve or butterfly valve 54 of a carburetor 55.

A tension spring 56 may be mounted at one end 57 thereof on lever arm 52 intermediate the ends 51 and 53 of said lever arm 52, said tension spring 56 being anchored at its other end 58 to any stationary object 59, such as the engine block, said spring 56 being disposed so as to bias lever arm 52 and butterfly valve 54 in a normally closed position in carburetor 55.

Piston 44 is slidably disposed in a hydraulic cylinder 60, and said actuator rod 40 protrudes from one end 61 of said cylinder 60 through a suitably packed opening 62 in said end 61 of cylinder 60.

A compression spring 63 is disposed in cylinder 60 between piston 44 and end 61 of cylinder 60. Said compression spring 63 serves as a counterbalance to hydraulic pressure built up in the other side of cylinder 60, in the manner hereinafter described. It will be understood that other counterbalance means, such as a tension spring mounted externally on cylinder 60 and on actuator rod 40, may be utilized, and the description of a compression spring is by way of illustration and not by way of limitation.

Cylinder 60 has another end 64 having a port 65 giving hydraulic fluid access to the interior of cylinder 60 between end 64 and piston 44.

A hydraulic fluid pressure line 70 leads from a source of engine oil under pressure (not shown) to a first port A in a by-pass solenoid valve 80. A pressure-reducing fixed orifice 81 may be provided on line 70 intermediate the ends thereof.

A hydraulic fluid pressure line 90 leads from a second port B in solenoid valve 80 to a bleed-off control valve, hereinafter described.

A hydraulic fluid pressure line 91 leads from said line 90 to cylinder 60 by way of port 65 in end 64 of cylinder 60.

A hydraulic fluid pressure line 100 leads from the hereinafter described bleed-off control valve to a hydraulic fluid pressure bleed-off line 110.

Hydraulic fluid pressure bleed-off line 110 is connected at one end 111 thereof to fluid pressure line 90, and fluid pressure line 100 is connected to fluid pressure bleed-off line 110 intermediate the ends of said line 110. A fixed orifice 112 may be mounted on fluid pressure bleed-off line 110 intermediate the end 111 thereof and the connection with fluid pressure line 100.

At its other end fluid pressure bleed-off line 110 leads to an engine oil sump (not shown). Also intermediate the ends of fluid pressure bleed-off line 110, a hydraulic fluid pressure line 120 is connected. Said line 120 provides fluid pressure access from solenoid valve 80 by means of a third port C in said solenoid valve 80.

A two-pole generator 200 is electrically connected, in the manner hereinafter described, to a two-pole shunt electric motor 300, which is preferably a 12 volt D.C. motor. Motor 300 has a shaft 301, on which is mounted a gear drive 302, which is operatively connected to a gear 303 mounted on a shaft 304, preferably disposed parallel to shaft 301, said gear 303 being mounted adjacent one end 305 of shaft 304, so as to allow lateral movement of said gear 303 relative to gear drive 302.

Shaft 304 is rotatably suspended on brackets 306 and 307 intermediate the ends of shaft 304 by any suitable means, such as by bushings 308 and 309, respectively. The other end 310 of shaft 304 protrudes into the bleed-off control valve hereinafter described.

Said brackets 306 and 307 and their respective bushings 308 and 309 are spaced apart from each other, and disposed between said bushings 308 and 309 is a governor 400 of conventional design, having blades 401 and weights 402. Said governor 400 is firmly mounted on shaft 304, closely adjacent to bushing 308, by any suitable means, such as by set screws 403. If desired, a sleeve 404 may be circumferentially mounted on end 305 of shaft 304, and secured on said shaft 304 by said set screws 403.

The other ends of blades 401 are mounted on a sleeve 410, which is circumferentially disposed around shaft 304 between shaft 304 and bushing 309. The mounting of blades 401 on sleeve 410 may be by any suitable means, such as by set screws 411, blades 401 being mounted on sleeve 410 so as to be spaced apart from bushing 309 when the device is inoperative.

A collar 420 is mounted on sleeve 410, by any suitable means, such as by set screw 421. Said collar 420 is disposed so as to abut on bushing 309 when blades 401 of governor 400 are positioned apart from bushing 309, and prevent further lateral movement of shaft 304 to the left in the diagrammatic illustration of FIGURE 1, under conditions hereinafter described.

A normally open bleed-off control valve 500 has an end 501 which is provided with an opening 502 adapted to slidably receive end 310 of shaft 304. Internally disposed in valve 500 and aligned with shaft 304 is a valve stem 503 having an end 504 also disposed in opening 502 in selective abutting position with end 310 of shaft 304. The other end 505 of valve stem 503 has a rear valve stem guide 506 slidably mounted thereon, said guide 506 being disposed in a chamber 507 adjacent the sealed end 508 of valve 500. Bearing 509 may be mounted in opening 502 in end 501 of control valve 500.

Adjacent end 501 of valve 500 is a second chamber 520. Transversely mounted in said chamber 520 is a forward valve stem guide 521 and a diaphragm 521a which is circumferentially mounted on valve stem 503. A split collar 522 may secure diaphragm 521a on valve stem 503.

Intermediate chamber 520 and chamber 507 and separating said chambers 520 and 507 is an annular ring or valve seat 530. Mounted on valve stem 503 and disposed in chamber 520 is a valve 531, adapted to be selectively seated on valve seat 530 on lateral movement of valve stem 503. A compression spring 532 is circumferentially mounted on valve stem 503 and seated on valve 531 and on rear guide 506.

Hydraulic fluid pressure line 100 leads from chamber 520 of control valve 500 to hydraulic fluid pressure bleed-off line 110, and hydraulic fluid pressure line 90 leads to chamber 507 of control valve 500.

A source of electric power, such as a twelve-volt battery 600, has a line 601 leading to a three-pole, single-throw, master switch 602, having poles 603, 604 and 605. Master switch 602 has a throw-arm 606 suitably accessibly mounted on, say, the dashboard 607 of the automobile. Pole 603 of master switch 602 has a line 610 leading to solenoid valve 80. A line 611 leads from solenoid valve 80 to a throttle switch 620.

Throttle switch 620 is normally open, and is controlled by a plunger 621. A detent 622 is mounted on rod 21 and disposed so as to make abutting contact with plunger 621 of throttle switch 620, and thus selectively close throttle switch 620 when predetermined pressure is applied to pedal 10. A line 623 leads from throttle switch 620 to a rheostat 630 and to battery 600.

Rheostat 630 may be selectively regulated by any suitable means, such as by an operating rod 631 connected to a dial knob 632 mounted in readily accessible position as, say, on dashboard 607, in association with a dial 633 containing various vehicular speed indications. A line 634 leads from rheostat 630 to the field circuit 201 of generator 200. Another line 635 leads from field circuit 201 of generator 200 to pole 604 of master switch 602.

A line 640 leads from armature 202 of generator 200 to a secondary or control field 641 of motor 300, and a line 642 leads from control field 641 of motor 300 back to armature 202 of generator 200.

A line 650 leads from pole 605 of master switch 602 to a primary field 651 of motor 300, said primary field 651 being shunt-connected with armature 652 of motor 300. A return line 653 leads from motor 300 to the source of power 600.

Generator 200 is driven by the vehicle's transmission (not shown), and consequently, the output current of generator 200 will vary directly with the transmission speed, and hence, with vehicular speed.

Output of armature 202 of generator 200 is electrically connected with secondary or control field 641 of motor 300. Motor 300 normally operates at a constant r.p.m., but it will be seen that any increase in current output from generator armature 202 will allow more current to flow through control field 641 of motor 300 and motor r.p.m. will decrease, whereas any decrease in generator armature 202 output will cause less electrical current to flow, and therefore, the flux per pole in motor 300 will decrease, as will the back E.M.F. of motor 300, thus allowing motor current to flow through armature 652 of motor 300.

Increase in current in armature 652 will be greater than the decrease in the flux, so that the torque developed will be greater than necessary for the load of motor 300, and motor 300 will thus increase in r.p.m. No separate resistance is used in motor 300, but in lieu thereof, the two separate windings, the secondary or control winding 641, and the main or primary winding 651 are utilized, when motor 300 is operating by means of its electrical connection with master switch 602. If no current has built up in secondary field 641, motor 300 will operate at a constant r.p.m., but as current flows through secondary field 641, the flux per pole being increased, the back e.m.f. will likewise increase, thereby decreasing the armature 652 current. Reduction in armature 652 current will result in decrease of motor r.p.m.

Output of generator 200 is controlled by rheostat 630, which is combined with dial knob 632 for selective vehicular speed control setting. Because rheostat 630 is in the field circuit 201 of generator 200, adjustment of rheostat 630 and dial knob 632 will either increase or decrease the field excitation of field circuit 201 of generator 200. For practical purposes, and by way of illustration but not by way of limitation, it has been found that the lowest practical speed setting for the device of the present invention is 25 m.p.h. At that vehicular speed, generator 200 will have sufficient output to slightly reduce the r.p.m. of motor 300 to a normal constant speed. Governor 400, shaft 304, and valve stem 503 are positioned so that bleed-off control valve 500 will maintain a uniform hydraulic pressure, by way of hydraulic fluid pressure lines 90 and 91, in cylinder 60, at the end 64 thereof, in back of piston 44. As long as said hydraulic pressure remains uniform, the vehicle will proceed at a constant speed. As vehicular speed changes, generator 200 r.p.m. will similarly change, as will output of generator 200 to control field 641 of motor 300, and thus, the r.p.m. of motor 300 will also change accordingly.

Because governor 400 is gear-driven by motor 300, the r.p.m. of governor 400 will also change, and furthermore, because governor 400 is firmly connected to shaft 304, shaft 304 will move to the right on increased r.p.m. of governor 400, and to the left on decreased r.p.m. thereby either closing or opening bleed-off control valve 500, which in turn will either increase or lower the hydraulic pressure in cylinder 60.

Increase of hydraulic pressure in cylinder 60 will move piston 44 to the right, against the bias of compression spring 63, and decrease of hydraulic pressure in cylinder 60 will move piston 44 to the left. It will be readily seen that when piston 44 moves either to the right or to the left, under increased or decreased hydraulic pressure in cylinder 60, flow valve 54 of carburetor 55 will be affected accordingly.

In operation, when throw arm 606 of master switch 602 is in "off" position, no current will flow through the system, and the device will be inoperative. When throw arm 606 is moved to the closed position, electric current will flow to the entire system. When the vehicle is moving, generator 200 will be functioning, and there will be an output of current from generator 200 to motor 300. Solenoid valve 80, however, will be closed until throttle switch 620, which is normally open, is closed. Closing of throttle switch 620 is accomplished when sufficient pressure is placed on pedal 10 to move rod 21 until detent 622 abuts on plunger 621.

When the vehicle is parked and the engine is not operating, of course there will be no hydraulic fluid pressure in line 70 or the rest of the system, and the device will be in a static condition.

If the engine is now started but the vehicle is not moving forward, pressure will build up in line 70, but solenoid valve 80 will not be activated, and no pressure will flow through solenoid valve 80. Ports B and C being in open communication with each other, no pressure will build up in cylinder 60 and its connecting lines.

If the operator of the vehicle now desires to drive forward without speed control, he merely accelerates in the normal manner, by applying pressure on pedal 10, with the master switch 602 open. Under these conditions the electrical system of the device will not be energized, and the pressure on pedal 10 will operate in the standard manner, by way of rod 21, rocker arm 23, rod 30, and lever arm 52, to provide normal throttle, regardless of whether detent 622 is, or is not, in contact with plunger 621 to close throttle switch 620, which will not be energized because master switch 602 will be open, and consequently, solenoid valve 80 will not be energized, and fluid under pressure will still by-pass the system by flowing from port A to port C and back to the sump.

If the vehicle is then proceeding at a speed of, say, 30 m.p.h., and the operator of the vehicle desires to travel at a controlled vehicular speed of 45 m.p.h., the operator will turn dial knob 632 until the vehicular speed of 45 m.p.h. is indicated on dial 633 and move arm 606 of master switch 602 to the "on" or closed position.

Under these conditions, the excitation of field 201 of generator 200 will decrease, and there will be very little output from generator 200 to control field 641 of motor 300. With little or no electrical current flowing in control field 641 of motor 300, r.p.m. of motor 300 will increase, and r.p.m. of governor 400 will increase correspondingly, moving shaft 304 to the right, in turn moving valve stem 503 to the right to close bleed-off control valve 500. As pressure is applied to pedal 10, and detent 622 and plunger 621 close throttle switch 620, solenoid 80 will be energized, and engine oil under pressure will flow through ports A and B of solenoid valve 80, by way of lines 90 and 91, to cylinder 60, thus causing piston 44 to move to the right, and opening flow valve 54 in carburetor 55 so as to increase throttle. As vehicular speed increases, the r.p.m. of generator 200 will also increase, and more current will flow through control field 641 of motor 300. This will cause a slight decrease in r.p.m. of motor 300 and of governor 400. Shaft 304 will then move to the left, allowing valve stem 503, biased by compression spring 505, also to move to the left, thus opening slightly bleed-off control valve 500 and allowing bleed-off through lines 100 and 110, in turn maintaining hydraulic pressure in cylinder 60 in back of piston 44 to hold throttle at the selected speed setting.

As vehicular speed approaches and finally reaches 45 r.p.m., sufficient current will be flowing from generator 200 through control field 641 of motor 300, so that motor 300 reaches its normal operating speed, as does governor 400, and bleed-off control valve 500 will remain open and maintain the proper hydraulic pressure in cylinder 60 to hold piston 44 in a position to control throttling to that required at the vehicular speed of 45 m.p.h.

If the vehicle should be traveling along the highway at the controlled speed of 45 m.p.h., and starts on down a downgrade, the output of generator 200 will increase, thereby causing more current to flow in the control field 641 of motor 300, in turn causing an r.p.m. reduction in motor 300. The decrease of r.p.m. in motor 300 will cause a similar decrease in r.p.m. in governor 400, and shaft 304 and valve stem 503 will move to the left, further opening bleed-off control valve 500, thus decreasing hydraulic pressure in cylinder 60 in back of piston 44. Piston 44, impelled by compression spring 53, will move to the left and cause a further dethrottling of the engine, with a consequent reduction in vehicular speed to the set speed of 45 r.p.m.

If the vehicle should then start on an upgrade, the output of generator 200 will decrease, causing less current to flow through control field 641 of motor 300, the r.p.m. of which will increase, in turn causing the r.p.m. of governor 400 to increase. Shaft 304 will then be caused to move to the right, in turn moving valve stem 503 to the right to start to close bleed-off control valve 500. Hydraulic pressure in cylinder 60 in back of piston 44 will increase, moving piston 44 to the right and increasing throttle.

Because very little time is required to attain the electrical power changes in generator 200 and motor 300, rapid response to vehicular speed changes is obtained, and very small variations in a given set speed will occur.

Fixed orifice 112 is disposed so as to permit a predetermined amount of bleed-off of hydraulic fluid pressure at all times, regardless of whether bleed-off control valve 500 is open or closed, and fixed orifice 81 is disposed so as to control engine oil pressure. Consequently, a well balance device is provided.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures and devices. In particular it will be recognized that the device, although discussed in its application to a carburetor, is also equally adaptable for use with the fuel input means of a diesel engine.

What is claimed is:

1. An electro-hydraulic device for adjustable control of the speed of operation of an internal combustion engine which comprises: a generator having its speed controlled by drive means related to the load change factor of an internal combustion engine; an electric motor electrically connected to said generator and adapted to have its speed controlled by the output of said generator; a shaft geared to said motor; a governor mounted on said shaft and adapted to move said shaft axially relative to the speed of said motor; a hydraulic bleed-off control valve disposed so as to be motivated by said shaft; a hydraulic fluid bleed-off line connected to said control valve; a hydraulic fluid pressure line connected to said bleed-off valve; a hydraulic cylinder having first and second ends, connected to said hydaulic fluid pressure line at one end of said cylinder; a reciprocating piston slidably disposed in said cylinder; a piston rod mounted on said piston and protruding from the other end of said cylinder; a carburetor; a flow valve mounted in said carburetor; and means connected to said piston rod and to said flow valve for operating said flow valve upon reciprocal movement of said piston rod and piston.

2. An electro-hydraulic device for adjustable control of the speed of operation of an internal combustion engine, as defined in claim 1, wherein the speed of said generator is controlled by the vehicular speed of an automotive vehicle.

3. An electro-hydraulic device for adjustable control of the speed of operation of an internal combustion engine, as defined in claim 2, wherein the means for operating said flow valve comprises: an elongated slotted opening in the protruding end of said piston rod; a shank slidably disposed in said opening; and a lever arm having ends, pivotally mounted adjacent one end of said lever arm to said shank and having the other end of said lever arm operatively connected to said flow valve.

4. An electro-hydraulic device for adjustable control of the speed of operation of an internal combustion engine, as defined in claim 2, including: a by-pass solenoid valve mounted on said hydraulic fluid pressure line; a second hydraulic fluid pressure line leading from a source of hydraulic fluid under pressure to said solenoid valve; and a second hydraulic fluid bleed-off line leading from said solenoid valve to said first hydraulic fluid bleed-off line.

5. An electro-hydraulic device for adjustable control of the speed of operation of an internal combustion engine, as defined in claim 4, including means for controlling hydraulic pressure in said first hydraulic fluid bleed-off line and in said second hydraulic fluid pressure line.

6. An electro-hydraulic device for adjustable control of the speed of operation of an internal combustion engine, as defined in claim 4, including means for selectively activating and de-activating said solenoid valve.

7. An electro-hydraulic device for adjustable control of the speed of operation of an internal combustion engine, as defined in claim 6, wherein the means for selectively activating and de-activating said solenoid valve comprises: a source of electrical power; a master switch; a first electric current line leading from said source of electrical power to said master switch; a second electric current line leading from said master switch to said solenoid valve; and a third electric current line leading from said source of electrical power to said solenoid valve.

8. An electro-hydraulic device for adjustable control of the speed of operation of an internal combustion engine, as defined in claim 7, including: a throttle switch mounted on said third electric current line.

9. An electro-hydraulic device for adjustable control of the speed of operation of an internal combustion engine which comprises: a generator controlled by drive means related to the load change factor of an internal combustion engine; an electric motor electrically connected to said generator and adapted to have its speed controlled by the output of said generator; a shaft geared to said motor; a governor mounted on said shaft and adapted to move said shaft axially relative to the speed of said motor; a hydraulic bleed-off control valve disposed so as to be opened and closed by said shaft; a hydraulic fluid bleed-off line connected to said control valve; a hydraulic fluid pressure line connected to said bleed-off valve; a hydraulic cylinder having first and second ends, connected to said hydraulic fluid pressure line at one end of said cylinder; a spring-biased reciprocating piston slidably disposed in said cylinder and disposed so as to be motivated by increase or decrease of hydraulic pressure in said cylinder; a piston rod mounted on said piston and protruding from the other end of said cylinder; adjustable fuel input means on said engine; and means connected to said piston rod and to said fuel input means for adjusting said fuel input means upon reciprocal movement of said piston rod and piston.

10. An electro-hydraulic device for adjustable control of the speed of operation of an internal combustion engine which comprises: a source of electric power; a generator controlled by the vehicular speed of an automotive vehicle, and having a control field and an armature, said control field being electrically connected to said source of electric power; an electric motor having a control field electrically connected to the armature of said generator, and having a shunt-connected primary field and armature electrically connected to said source of electric power; a shaft geared to said motor; a governor mounted on said shaft and adapted to move said shaft axially relative to the speed of said motor; a hydraulic bleed-off control valve disposed so as to be motivated by said shaft; a source of hydraulic fluid under pressure; a hydraulic fluid bleed-off sump; a hydraulic fluid bleed-off line connected to said control valve and to said sump; a hydraulic fluid pressure line connected to said source of hydraulic fluid and to said bleed-off valve; a hydraulic cylinder having first and second ends, connected to said hydraulic fluid pressure line at one end of said cylinder; a reciprocating piston slidably disposed in said cylinder; a carburetor; a flow valve mounted in said carburetor; and means connected to said piston and to said flow valve for operating said flow valve upon reciprocal movement of said piston.

11. An electro-hydraulic device for adjustable control of the speed of operation of an internal combustion engine, as defined in claim 10, including: a by-pass solenoid valve mounted on said hydraulic fluid pressure line; and a second hydraulic fluid bleed-off line leading from said solenoid valve to said first hydraulic fluid bleed-off line.

12. An electro-hydraulic device for adjustable control of the speed of operation of an internal combustion engine, as defined in claim 10, including: a rheostat electrically connected to said source of electric power and to said generator control field.

13. An electro-hydraulic device for adjustable control of the speed of operation of an internal combustion engine, as defined in claim 10, including: a master electric switch disposed so as to selectively open and close the electric connections between said source of electric power and said generator, said electric motor, and said solenoid valve.

14. An electro-hydraulic device for adjustable control of the speed of operation of an internal combustion engine, as defined in claim 10, including: an electric throttle switch disposed between said source of electric power and said solenoid valve so as to selectively open and close the electric connection between said source of electric power and said solenoid switch.

15. An electro-hydraulic device for adjustable control of the speed of operation of an internal combustion engine, as defined in claim 14, including: an accelerator pedal; and means associated with said accelerator pedal to open and close said throttle switch.

16. An electro-hydraulic device for adjustable control of the speed of operation of an internal combustion engine, as defined in claim 15, including: means connected to said accelerator pedal and said flow valve for selectively operating said flow valve when said throttle switch is open.

17. An electro-hydraulic device for adjustable control of the speed of operation of an internal combustion engine which comprises: a source of electric power; a generator controlled by the vehicular speed of an automotive vehicle and electrically connected to said source of electric power; an electric motor electrically connected to said generator and adapted to have its speed controlled by the output of said generator; a shaft geared to said motor; a governor mounted on said shaft and adapted to move said shaft axially relative to the speed of said motor; a hydraulic bleed-off control valve disposed so as to be opened and closed by axial movement of said shaft; a source of hydraulic fluid under pressure; a hydraulic fluid bleed-off sump; a hydraulic fluid bleed-off line connected to said control valve and to said sump; a hydraulic fluid pressure line connected to said source of hydraulic fluid and to said bleed-off valve; a hydraulic cylinder connected to said hydraulic fluid pressure line at one end of said cylinder; a spring-biased reciprocating piston slidably disposed in said cylinder so as to resist hydraulic fluid pressure in said cylinder; a carburetor; a flow valve mounted in said carburetor; means connected to said piston and to said flow valve for operating said flow valve upon reciprocal movement of said piston; an accelerator pedal; and means connected to said accelerator pedal and to said flow valve for operating said flow valve upon movement of said accelerator pedal when said source of electric power is disconnected.

18. An electro-hydraulic device for adjustable control of the speed of operation of an internal combustion engine, as defined in claim 17, wherein the means connected to said piston and to said flow valve for operating said flow valve includes: a piston rod mounted on said piston and protruding from said cylinder; and a lever arm having ends and mounted adjacent one end to said piston rod and adjacent the other end to said flow valve.

19. An electro-hydraulic device for adjustable control of the speed of operation of an internal combustion engine, as defined in claim 18, including means biasing said lever arm and flow valve to a closed position of said flow valve.

20. An electro-hydraulic device for adjustable control of the speed of operation of an internal combustion engine, as defined in claim 18, wherein said lever arm is selectively engageably and disengageably connected to said piston rod.

21. An electro-hydraulic device for adjustable control of the speed of operation of an internal combustion engine, as defined in claim 20, including: means mounted on said lever arm for operating said lever arm upon movement of said accelerator pedal when said lever arm is disengaged from said piston rod.

22. An electro-hydraulic device for adjustable control of the speed of operation of an internal combustion engine which comprises: a source of electric power; a generator controlled by the vehicular speed of an automotive vehicle and electrically connected to said source of electric power; an electric motor electrically connected to said generator and adapted to have its speed controlled by the output of said generator; a shaft geared to said motor; a governor mounted on said shaft and adapted to move said shaft axially relative to the speed of said motor; a hydraulic bleed-off control valve disposed so as to be opened and closed by axial movement of said shaft; a source of hydraulic fluid under pressure; a hydraulic fluid bleed-off sump; a hydraulic fluid bleed-off line connected to said control valve and to said sump; a hydraulic fluid pressure line connected to said source of hydraulic fluid and to said bleed-off valve; a hydraulic cylinder connected to said hydraulic fluid pressure line at one end of said cylinder; a by-pass solenoid valve connected to said source of electric power and mounted on said hydraulic fluid pressure line between said source of hydraulic fluid and said cylinder; a spring-biased reciprocating piston slidably disposed in said cylinder so as to resist hydraulic fluid pressure in said cylinder; adjustable fuel input means on said engine; means connected to said piston and to said fuel input means for adjusting said fuel input means upon reciprocal movement of said piston; an accelerator pedal; an electric throttle switch connected to said solenoid valve; and means associated with said pedal for opening and closing said throttle switch.

23. An electro-hydraulic device for adjustable control of the speed of operation of an internal combustion engine, as defined in claim 22, wherein the means for opening and closing said throttle switch comprises: a rod pivotally mounted on said pedal; a detent mounted on said rod; and a plunger mounted on said switch and disposed so as to be depressed by contact with said detent and to close said switch.

No references cited.